US00RE41816E

(19) United States
(12) Reissued Patent
Liu et al.

(10) Patent Number: US RE41,816 E
(45) Date of Reissued Patent: Oct. 12, 2010

(54) DISH ANTENNA ROTATION APPARATUS

(75) Inventors: Eric Liu, Hsinchu (TW); Cosine Guo, Hsinchu (TW); Jeffrey Gau, Hsinchu (TW)

(73) Assignee: Wistron NeWeb Corporation, Hsi-Chih, Taipei hsien (TW)

(21) Appl. No.: 10/931,241

(22) Filed: Sep. 1, 2004

Related U.S. Patent Documents

Reissue of:
(64) Patent No.: 6,445,361
Issued: Sep. 3, 2002
Appl. No.: 09/734,500
Filed: Dec. 11, 2000

(30) Foreign Application Priority Data

May 29, 2000 (TW) ..... 89209347

(51) Int. Cl.
*H01Q 3/02* (2006.01)
*H01Q 1/12* (2006.01)
*H01Q 1/08* (2006.01)

(52) U.S. Cl. ..... 343/882; 343/878; 343/880

(58) Field of Classification Search ..... 343/776, 343/840, 878, 879, 880, 882, 890, 892
See application file for complete search history.

(56) References Cited

U.S. PATENT DOCUMENTS 4,495,706 A * 1/1985 Kaminski ..... 33/333
5,122,810 A * 6/1992 Nisbet et al.
6,008,769 A * 12/1999 Palmiter et al. ..... 343/766
6,081,240 A * 6/2000 Hemmingsen
6,188,372 B1 * 2/2001 Jackson et al.
6,535,177 B1 3/2003 Dhellemmes et al.

* cited by examiner

*Primary Examiner*—Shih-Chao Chen
(74) *Attorney, Agent, or Firm*—Winston Hsu

(57) ABSTRACT

A rotation apparatus for a dish antenna provides a system for easily adjusting the dish antenna to a precise receiving position. The rotation apparatus includes a dish bracket which is fixed to the back of the dish antenna. The dish bracket includes a plurality of circular grooves and a concentric axle center. An elevation bracket includes a pair of wings and a bottom. The wings are parallel, and the bottom is perpendicular to the wings. Each wing pivots about an axle which passes through a first portion of each wing. A second portion of each wing includes a guide groove to adjust a elevation angle of the dish. The bottom includes a central axle hole and a plurality of holes. The central axle hole is coupled to the concentric axle center. After the dish is rotated to a selected position, the plurality of holes are secured to the circular grooves using a plurality of screws.

37 Claims, 10 Drawing Sheets

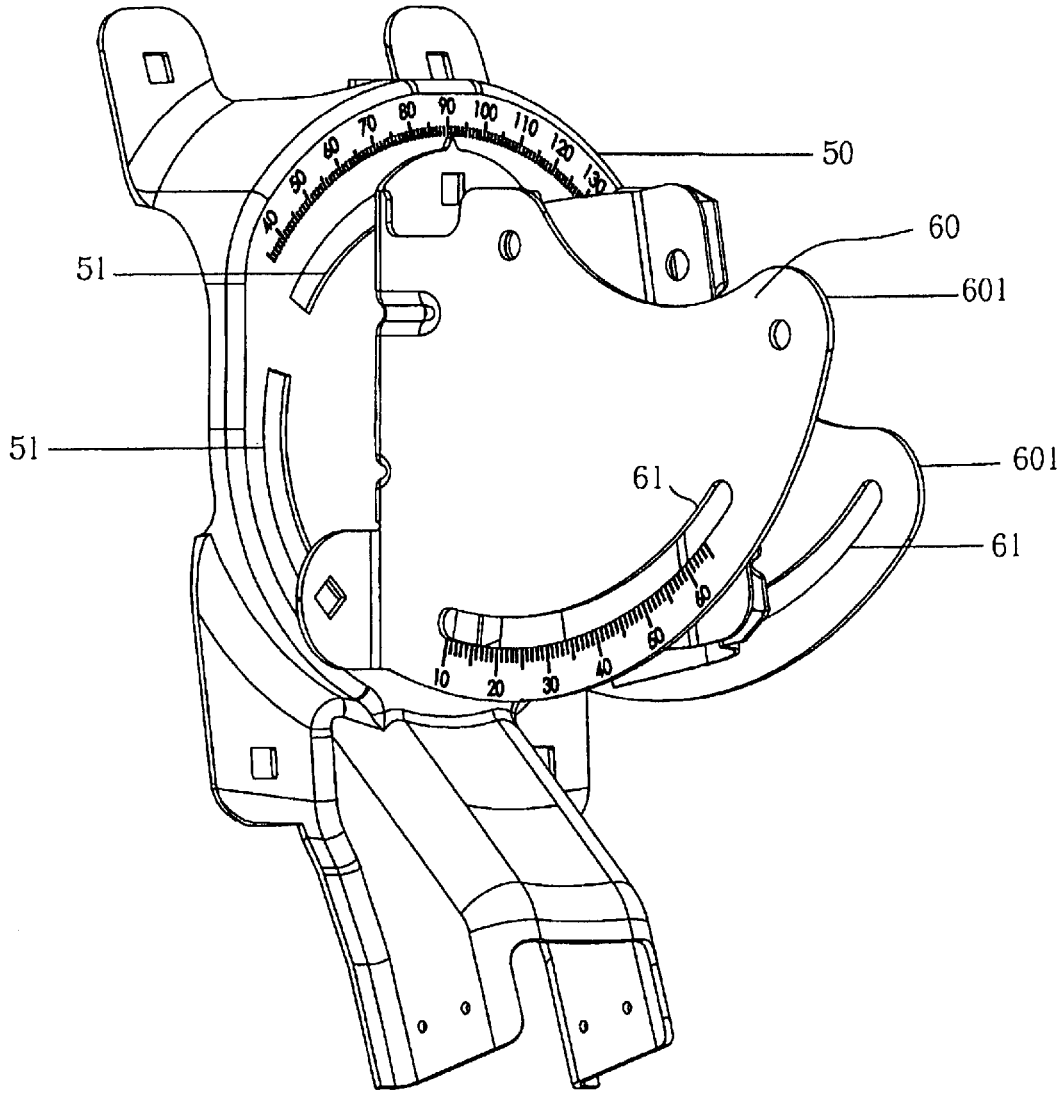
FIG. 5
Amended

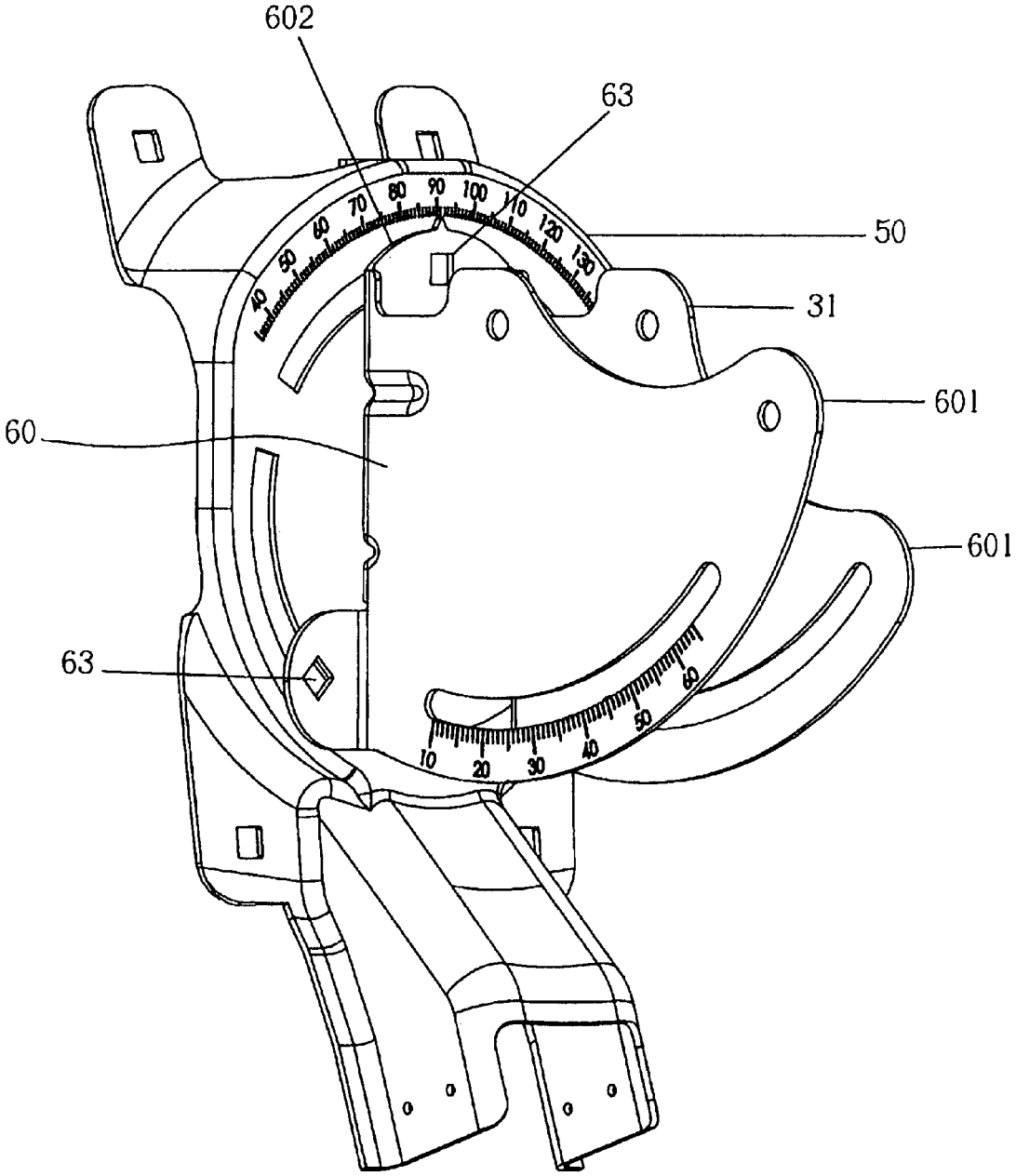
FIG. 7
Amended

DISH ANTENNA ROTATION APPARATUS

Matter enclosed in heavy brackets [ ] appears in the original patent but forms no part of this reissue specification; matter printed in italics indicates the additions made by reissue.

REFERENCE TO RELATED APPLICATION

The present application claims priority from Taiwan Patent Application No. 089209347, entitled "Dish Antenna Rotation Apparatus," filed on May 24, 2000.

BACKGROUND OF THE INVENTION

1. Field of the Invention

The invention provides a dish antenna rotation apparatus. The apparatus comprises a dish bracket and an elevation bracket. The dish bracket can more easily and exactly adjust a rotation angle. The elevation bracket can more easily and exactly adjust an elevation angle.

2. Description of the Related Art

A synchronous direct broadcast satellite (DBS) is a one point to multi-points communication system in which signals from the DBS can be received by a small antenna and a tuner device. Generally speaking, the DBS can receive signals from a specific earth surface transmitter, and then the DBS can send the signals to multiple earth surface receivers. After an earth surface receiver collects the signals of the DBS into a dish reflector, the signals are focused on at least one low noise block with feed convertor (LNBF), which is in the rear of the dish reflector. The LNBF can selectively receive the signal. The LNBF has the same functions as those for a filter and an amplifier, and further comprises a forward waveguide antenna and a backward component. The forward waveguide antenna can receive the signals, and the backward component can transform the radio frequency signals into the intermediate frequency signals to the tuner devices.

For the better communications between a receiver and a DBS, the receiver needs to be positioned based on the difference of longitudes and latitudes of the receiver and the DBS. In other words, the receiving angles of the receiver, such as a rotation angle, an elevation angle and an azimuth angle, have to be adjusted based on the location of the DBS.

According to the foregoing, a multi-beam antenna rotation apparatus can be used for receiving the signals of multiple satellites. The rotation apparatus can be adjusted to a selected rotation angle, to a selected elevation angle and to an azimuth angle of a dish antenna. Taking the U.S. and the PRC, for example, three DBSs are respectively located at 101 degrees west longitude, 110 degrees west longitude, and 119 degrees west longitude. Thus, the rotation angle of the apparatus ranges between +55 degrees and −55 degrees, and the elevation angle ranges between 0 degree and 65 degrees.

In addition, because the receiver is sensitive to the position of the DBSs and has to be able to endure 60 m/s of wind pressure, the receiver is more difficult to manufacture. Therefore, the design of a rotation apparatus of the receiver becomes very important.

FIG. 1 illustrates a present rotation apparatus for a dish antenna. The apparatus comprises a dish 10, an elevation bracket 20, a clamp 31, a mast 32 and a pedestal 33. The dish 10 includes two sides. One side is concave. The other side forms a flange 11. The flange 11 includes a pair of bolts 12 and a concentric axle 13. The elevation bracket 20 further comprises a pair of fold wings 22 and a bolt 23. The bolt 23 passes through the fold wings 22. Each of the fold wings 22 further comprises a first wing 221 and an adjacent second wing 222. Each first wing 221 is perpendicular to the respective adjacent second wing 222. Each first wing 221 further comprises a respective vertical groove 24, and each second wing 222 further comprises a respective horizontal groove 21. At least one of the second wings 222 further comprises an extending arm 223. The extending arm 223 comprises a concentric axle hole 25. The concentric axle hole 25 is coupled to the concentric axle 13 of the dish 10 in order to rotate the dish 10. After the dish 10 is rotated, the horizontal grooves 21 are coupled to the pair of bolts 12 to securely combine the dish 10 with the elevation bracket 20.

As shown in FIG. 1, a clamp 31 is attached to one of the fold wings 22. The bolt 23 passes through holes 36 in the fold wings 22 and through holes 37 in the clamp 31. The bolt 23 operates as a pivot to permit the clamp 31 to move with respect to the fold wings 22. The clamp 31 can rotate about the pivot [23] to a specific elevation angle. Then the clamp 31 is fixed in the vertical grooves 24 of the fold wings 22. The clamp 31 is further attached to the mast 32. The mast 32 further couples to the pedestal 33. The pedestal 33 supports the dish 10.

As shown in FIG. 1, the elevation bracket 20 comprises the two separating fold wings 22. The fold wings 22 are fixed to the pair of bolts 12 of the flange 11 of the dish 10 by only two screws. For the rotation apparatus of FIG. 1, the receivers have to be adjusted in accordance with the position of a selected one of the DBSs, and the receivers have to be able to endure 60 m/s of wind pressure. Also, because the fold wings 22 of the elevation bracket 20 include both the vertical grooves 24 and the horizontal grooves 21, the vertical grooves 24 and horizontal grooves 21 cannot be independently adjusted. In other words, once the position of one of the grooves is changed, the positions of the other grooves also have to be readjusted.

Furthermore, the fold wings 22 are coupled to each other by only the bolt 23. This causes the symmetry of the fold wings to be weak. Thus, the fold wings cannot be symmetrically rotated with the dish 10, which results in a poor receiving precision. Furthermore, once the fold wings 22 are respectively readjusted, the fold wings 22 may change shape due to forced pulling and forced dragging. The changed shapes of the fold wings may further result in rough rotating when the next adjustment is made, which makes it more difficult to adjust the position of the clamp 31 for an accurate elevation angle.

SUMMARY OF THE INVENTION

In order to strengthen a rotation apparatus of a dish antenna as mentioned above, the present invention is directed to a dish bracket that provides a support for strengthening a rotation apparatus and a dish. Further, the invention uses three screws in triangular form to strongly secure an elevation bracket and the dish bracket.

In order to avoid readjusting a rotation angle that results in an elevation angle readjustment, the invention separates the relationship between a rotation angle and an elevation angle so that the two angles can be adjusted independently. Only the horizontal grooves are included as part of the elevation bracket. The vertical grooves are included as part of the dish bracket. Therefore, there is no need to readjust the elevation angle when the rotation angle is readjusted.

In addition, because the fold wings have a design that differs from the prior art, the fold wings are symmetrically rotated. The shapes of the fold wings do not change, and thus the clamp does not encounter rough movement when it is re-rotated.

In order to solve the foregoing problems of the prior art, the invention provides two fold wings that are coupled by a bottom portion. The fold wings and the bottom portion comprise an organic whole that operates as an elevation bracket. Because the bottom portion of the elevation bracket is close to the dish bracket, the bottom portion of the elevation bracket and the dish bracket can be rotated smoothly. In other words, the present invention solves the problem of unsymmetrical rotating so that exact adjustment of a rotation angle and an elevation angle can be accomplished. Furthermore, the fold wings also may advantageously include a trimmer device for providing better precision adjustment of the elevation angle.

In preferred embodiments, the dish bracket further includes a related peripheral device for installation as required by a multi-beam reflection antenna such as installing a multi-switch bracket for a multi-switch device and installing an arm for LNBFs.

BRIEF DESCRIPTION OF THE DRAWINGS

The following detailed description, given by way of examples and not intended to limit the invention to the embodiments described herein, will best be understood in conjunction with the accompanying drawings, in which:

FIG. 5 illustrates a perspective view of the invention for the elevation bracket and the dish bracket;

FIG. 7 illustrates a perspective view of the invention for the elevation bracket, the dish bracket and the clamp;

DETAILED DESCRIPTION OF THE PREFERRED EMBODIMENTS

Figure 2:
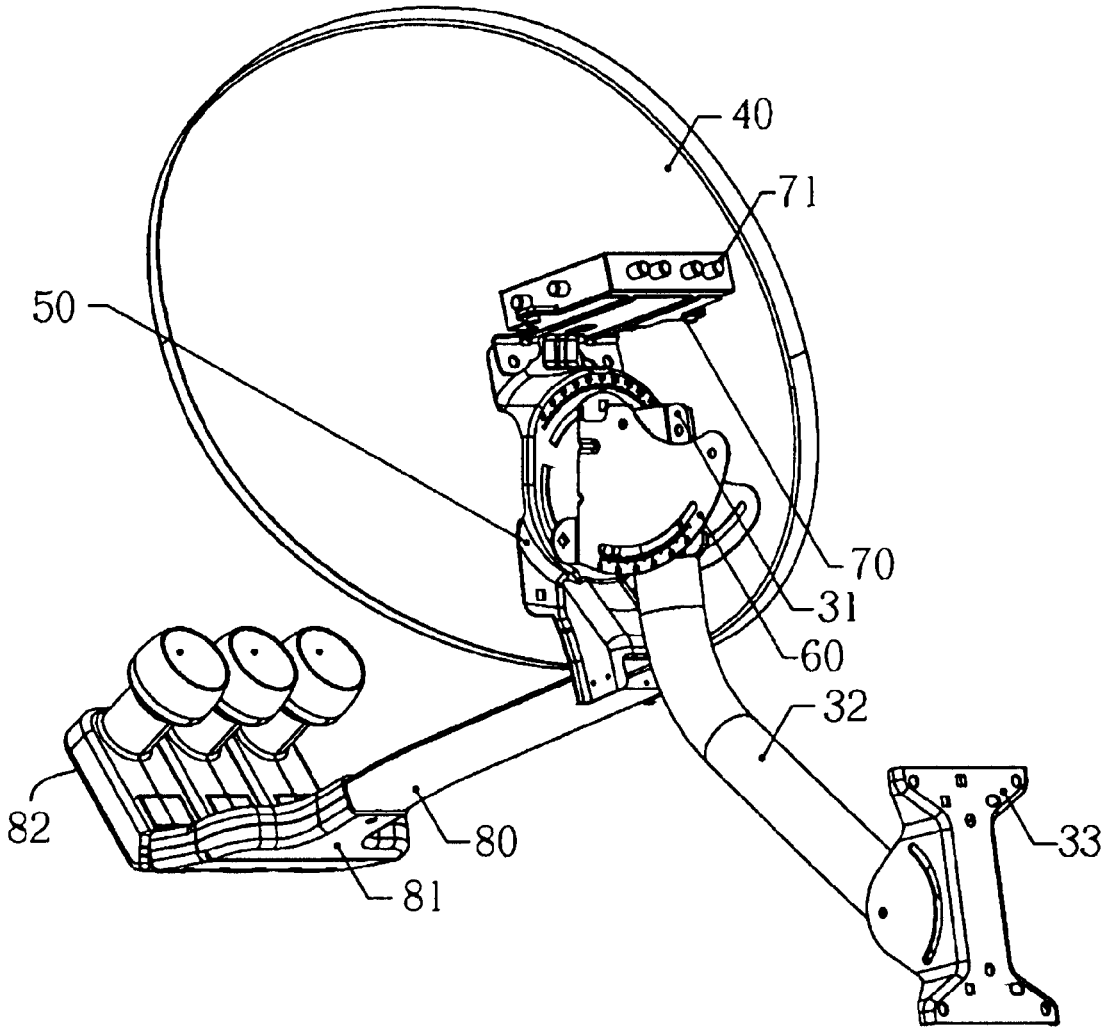
FIG. 2 illustrates a perspective view of the invention for a rotation apparatus of a dish antenna.

FIG. 2 illustrates a perspective view of the invention for the rotation apparatus of a dish antenna. The apparatus comprises a dish 40, a dish bracket 50, an elevation bracket 60, a multi-switch bracket 70, an arm 80 and a clamp 31. The clamp 31 further comprises a mast 32, which has one end coupled to a pedestal 33. The multi-switch bracket 70 is used for holding a multi-switch device 71. The arm 80 is used for connecting a Y-adapter 81 to support at least one LNBF 82.

Figure 3:
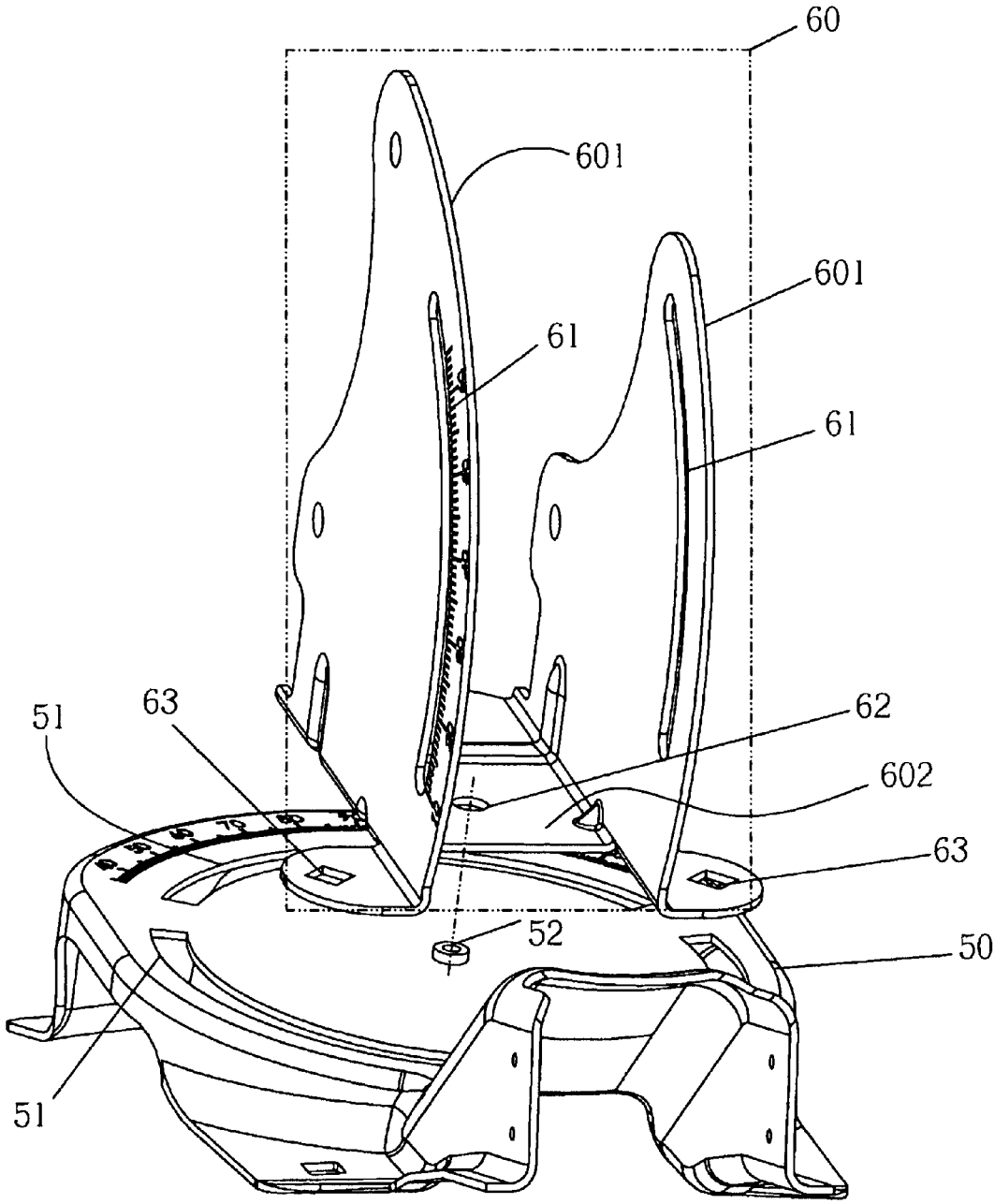
FIG. 3 illustrates a perspective view of the invention for an elevation bracket and a dish bracket.
Figure 4:
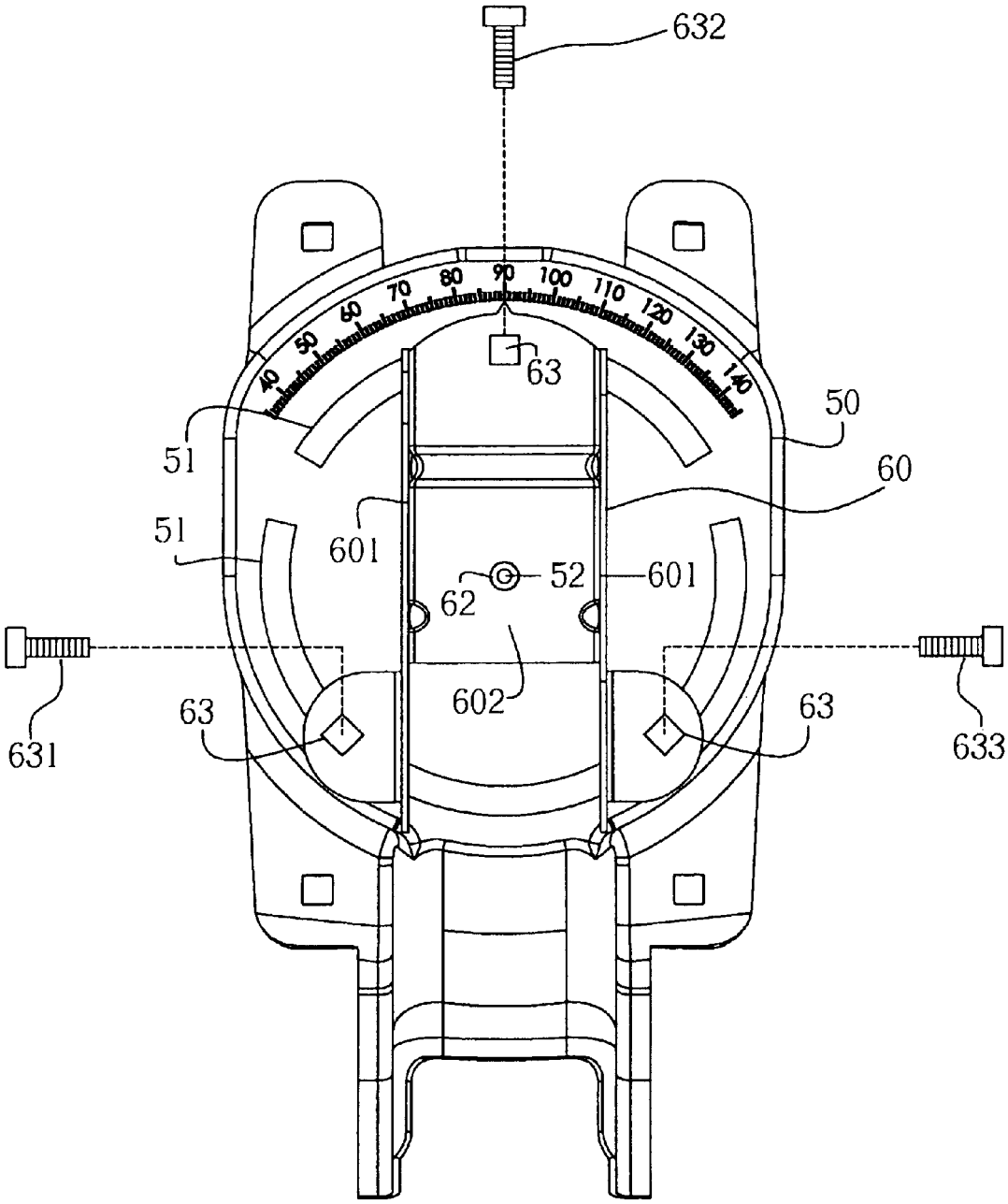
FIG. 4 illustrates a top view of FIG. 3 of the invention for the elevation bracket and the dish bracket.

FIG. 3 and FIG. 4 illustrate a perspective view and a top view, respectively, of the embodiment of FIG. 2 for an elevation bracket 60 and a dish bracket 50. As shown in FIG. 3, the dish bracket 50 includes two circular grooves 51 [and], *which form concentric circular grooves around* a circular axle center 52. The elevation bracket 60 further comprises a pair of wings 601 and a bottom portion 602, which are formed as an organic whole. The two wings 601 are substantially parallel to each other and are connected to each other by the bottom portion 602. Each wing 601 has a groove 61 in order to adjust an elevation angle of the dish 40. The bottom portion 602 includes a hole 62 to engage with the circular axle 52 of the dish bracket 50. The bottom portion 602 of the FIG. 4 can be positioned close to the dish bracket 50 in order to smoothly rotate the elevation bracket 60 to a selected rotation angle for the dish 40. After rotating the dish 40, three screws 631, 632, 633 are passed through three screws hole 63 of the bottom portion 602 to engage the dish bracket 50. The three screws 631–633 are positioned in a triangular pattern to align with the circular grooves 51 of the dish bracket 50 to thereby securely combine the elevation bracket 60 with the dish bracket 50.

FIG. 5 further illustrates a perspective view of the combination of the elevation bracket 60 and the dish bracket 50 according to the present invention. As shown in FIG. 5, the grooves 51 and 61 of the dish bracket 50 and the elevation bracket 60 include visible indicia to mark a scale that indicates the respective angles of rotation.

For use with DBSs, the circular grooves 51 of the dish bracket 50 allow the elevation bracket 60 to be rotated through a rotation angle of at least 110 angular degrees. The wings of the elevation bracket 60 allow the clamp 31 to be rotated through an elevation angle of at least 65 angular degrees.

Figure 1:
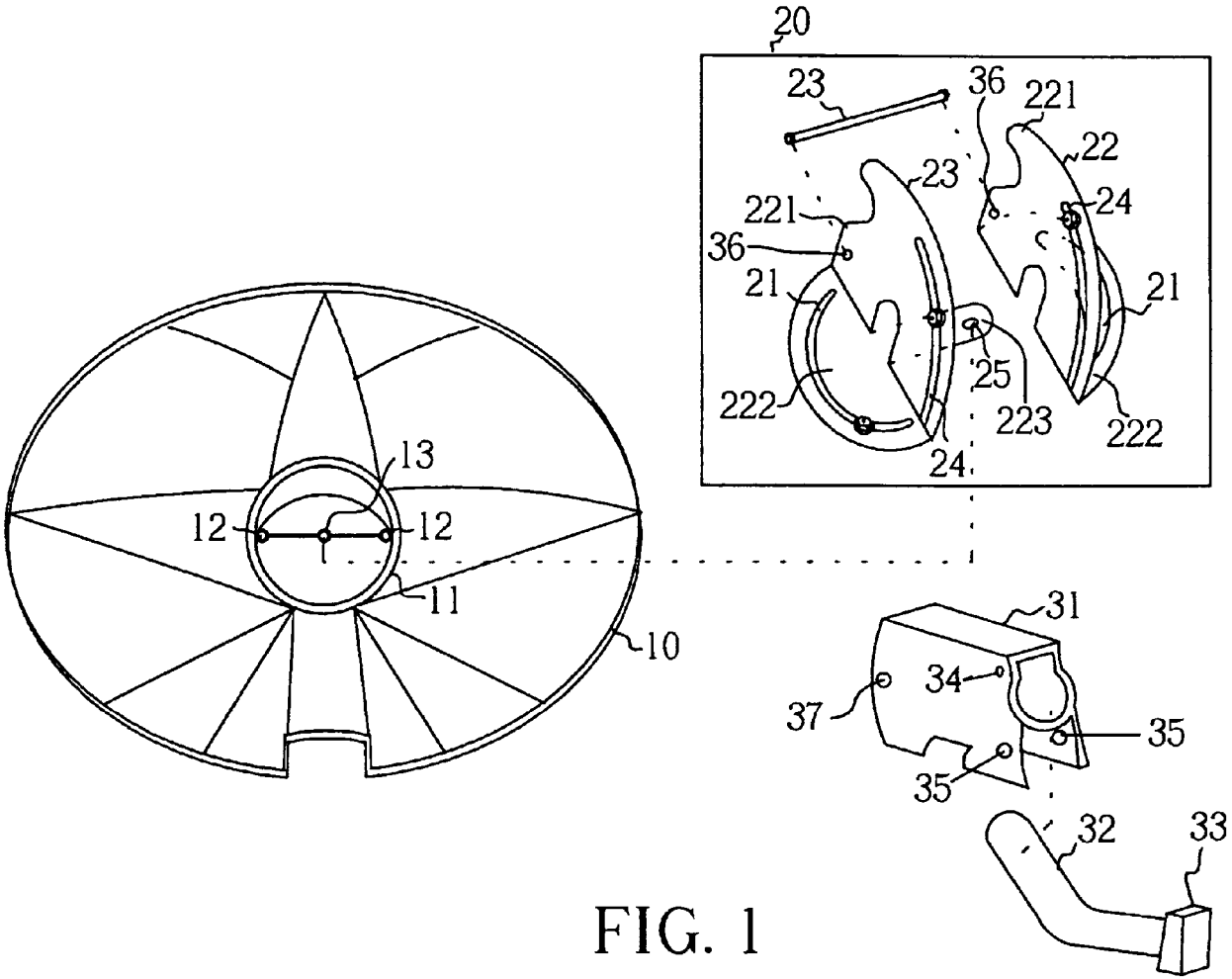
FIG. 1 (PRIOR ART)
FIG. 1 illustrates a perspective exploded view for a typical dish antenna.
Figure 6:
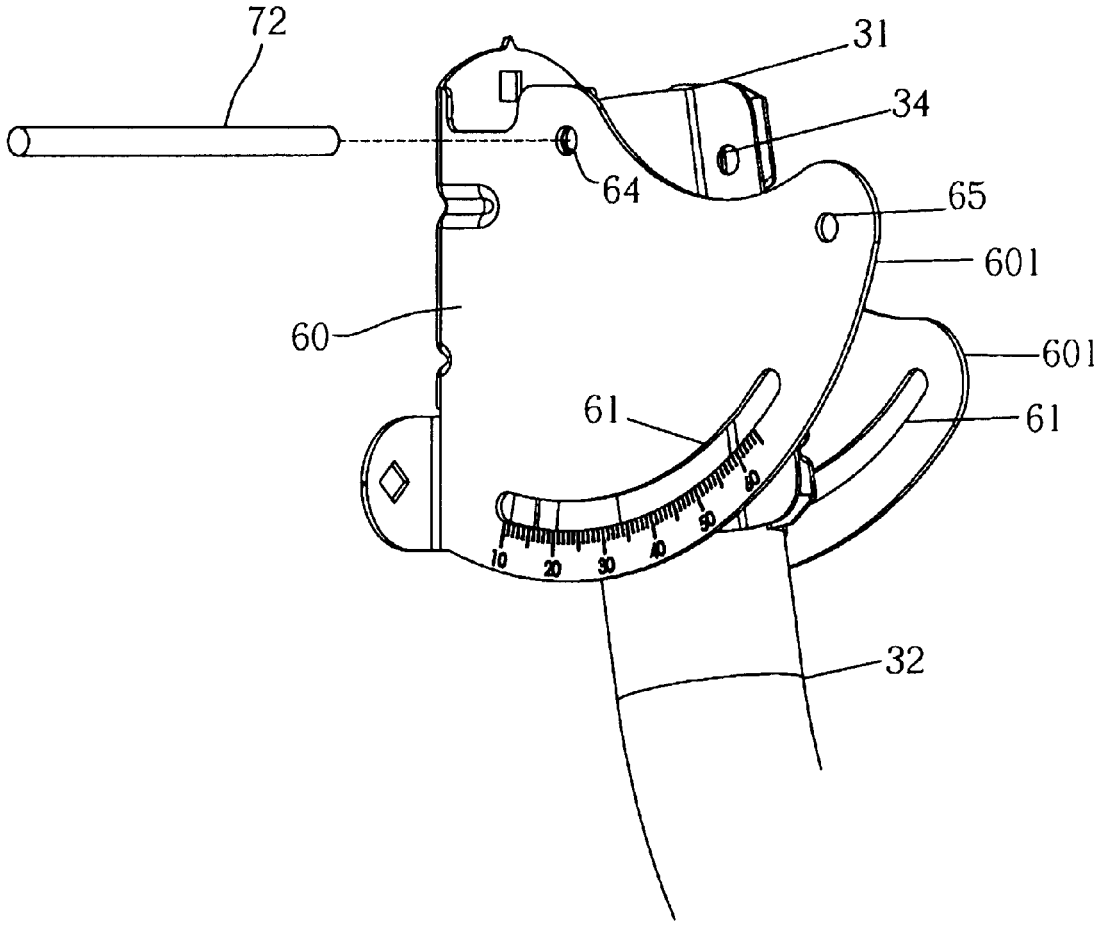
FIG. 6 illustrates a perspective view of the invention for the elevation bracket and a clamp.

FIG. 6 illustrates a perspective view for the combination of the elevation bracket 60 and the clamp 31. The clamp 31 is positioned between the two wings 601 of the elevation bracket 60. A bolt 72 passes through a pair of holes 64 *located* in the wings 601 of the elevation bracket 60 and through the holes 37 (FIG. 1) of the clamp 31. The bolt 72 operates as a pivot. The clamp 31 rotates about the pivot [72] to a specific elevation angle. The clamp 31 also includes a pair of holes 34 through which the clamp 31 is secured to the mast 32 by a screw (not shown) to thereby fix an azimuth angle of the dish 40.

FIG. 7 illustrates a perspective view of the elevation bracket 60, the dish bracket 50 and the clamp 31 combined. As shown in FIG. 7, the dish bracket 50, the elevation bracket 60, and the clamp 31 are closely coupled to each other. As discussed above, the bottom portion 602 is an organic portion of the elevation bracket 60. The bottom portion 602 provides increased contact area between the elevation bracket 60 and the dish bracket 50, which permits rotation in a smoother fashion to a more precise rotation angle.

In addition, because the elevation bracket 60 is an organic (i.e., integral) whole, the symmetry of the wings 601 is maintained, and the clamp 31 can be smoothly and exactly rotated to a selected elevation angle.

As discussed above, in order to more strongly combine the elevation bracket 60 with the dish bracket 50, the elevation bracket 60 of the invention uses the three screws 631–633 (FIG. 4) in a triangular pattern to secure the elevation bracket 60 to the dish bracket 50.

Figure 8:
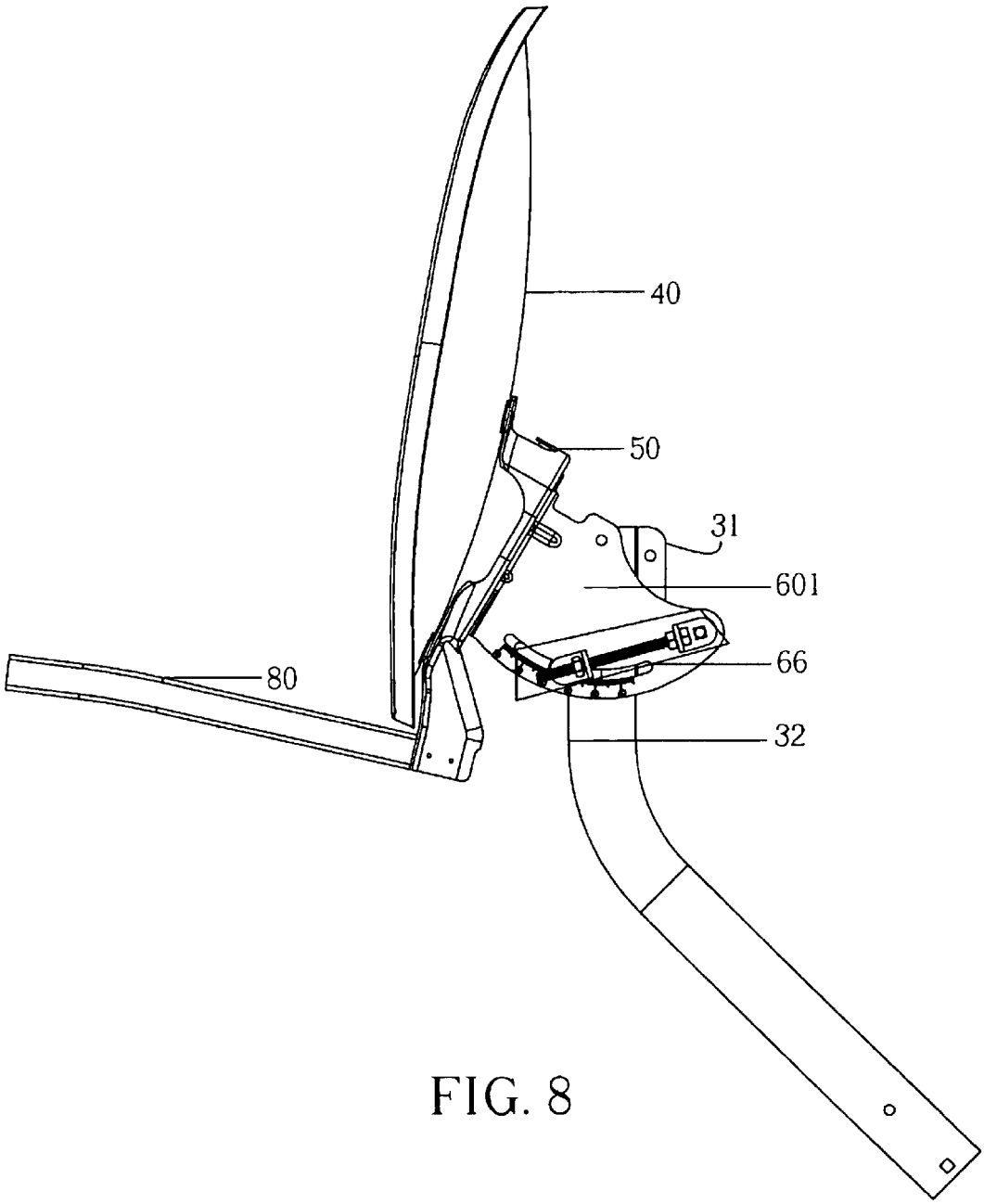
FIG. 8 illustrates a side elevational view of the invention for the rotation apparatus of a dish antenna.

FIG. 8 illustrates an side elevational view of an embodiment of the rotation apparatus of a dish antenna, which comprises the dish 40, the dish bracket 50, the elevation bracket 60, the clamp 31 and the mast 32, and further comprises a trimming apparatus 66 and an arm 80. The trimming apparatus 66 is installed on a hole 65 of the embodiment of FIG. 6 and is used to refine the elevation angle of the dish 40. As shown in FIG. 2, the arm 80 is secured to the dish bracket 50 to support the Y-adaptor 81. The Y-adaptor can support multiple LNBFs 82.

Figure 9:
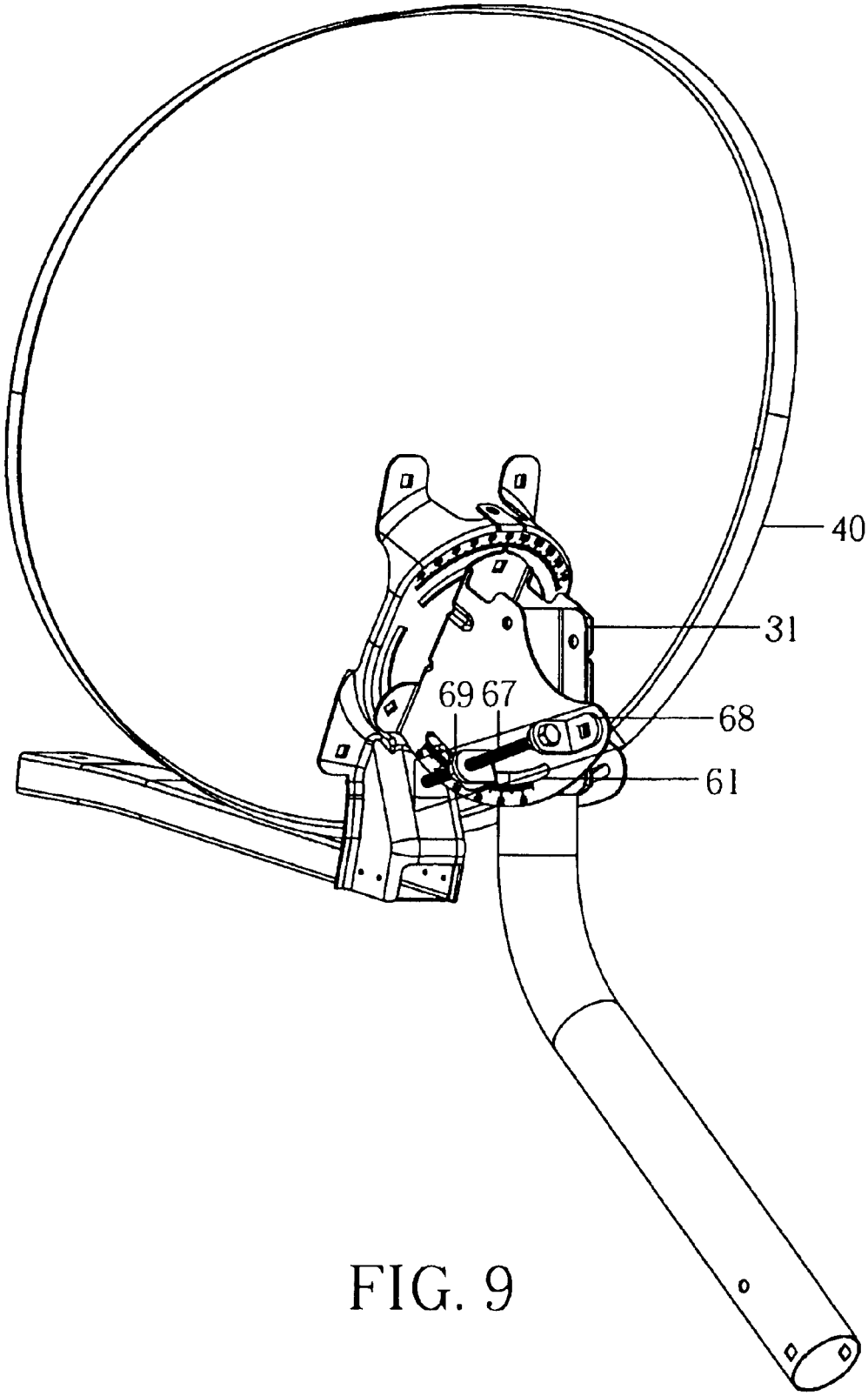
FIG. 9 illustrates a perspective view for a rotation apparatus of a dish antenna.

FIG. 9 further illustrates a perspective view of the trimming apparatus 66, which comprises a screw bolt 67 and two brackets 68 and 69. A screw (not shown) passes through the bracket 69 of the trimming apparatus 66 in FIG. 9 and a hole 35 (FIG. 1) of the clamp 31 to engage one of the grooves 61. The screw bolt 67 is rotated to change the distance between the two brackets 68 and 69 to refine the elevation angle of the clamp 31, and then the screw is tightened to maintain the selected elevation angle. Thus, the elevation angle of the dish 40 is refined.

Figure 10:
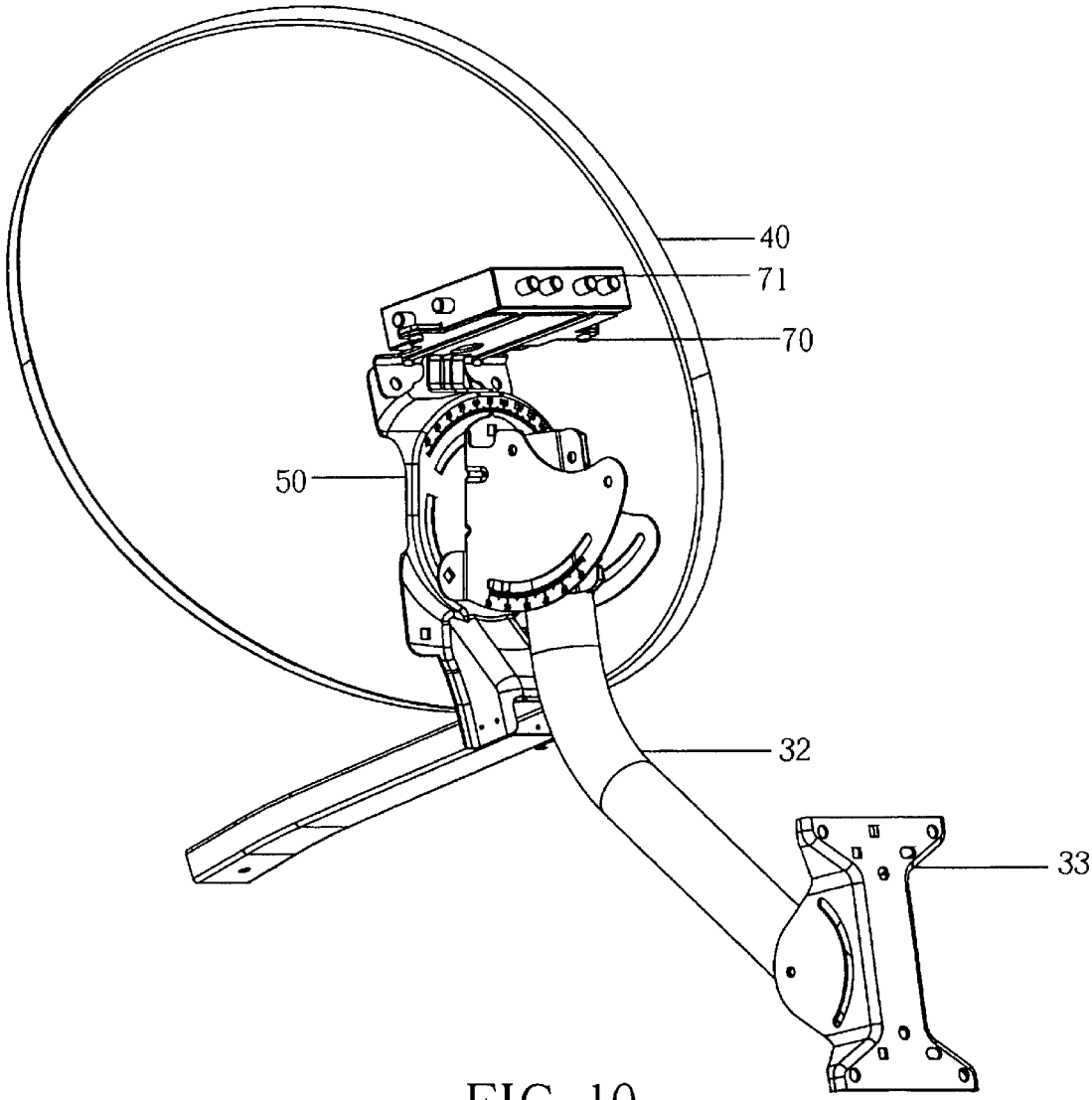
FIG. 10 illustrates a perspective view of the rotation apparatus of dish antenna with a multi-switch.

FIG. 10 illustrates a perspective view of the rotation apparatus of a dish antenna with a multi-switch 71. As shown in FIG. 10, the multi-switch bracket 70 is secured to the dish bracket 50. The multi-switch 71 is installed on the multi-switch bracket 70 to advantageously allow switching of the signals of the DBSs.

The pedestal 33 is connected to the mast 32. The pedestal 33 can be settled in the ground, secured to a wall or positioned in other locations to secure the dish 40 in a position to receive signals.

While the invention has been described with reference to various illustrative embodiments, the description is not intended to be construed in a limiting sense. Various modifications of the illustrative embodiments, as well as other embodiments of the invention, will be apparent to those people skilled in the art upon reference to this description. It is therefore contemplated that the appended claims will cover any such modifications or embodiments as may fall within the scope of the invention defined by the following claims and their equivalents.

What is claimed is:

1. A rotation apparatus for accurately positioning a dish antenna, comprising:

a dish bracket connected to a back of said dish antenna, said dish bracket including a plurality of circular grooves and a concentric axle center; and an elevation bracket adjustably positioned proximate to said dish bracket, said elevation bracket comprising:

a pair of parallel wings, wherein a pivot hole is formed on the front portion of the each wing for receiving a bolt which passes through each of said wings and a respective guide groove is formed in a portion of each of said wings to adjust an elevation angle of said dish antenna; and a bottom perpendicularly integrated to said wings, said bottom including a central axle hole coupled to said concentric axle center of said dish bracket, said bottom further including at least one hole aligned with said circular grooves of said dish bracket through which at least one fastener [may engage] *engages* said circular grooves to secure said elevation bracket to said dish bracket.

2. The rotation apparatus as defined in claim 1, further including a clamp, a mast and a pedestal, wherein said clamp is positioned between said wings and rotates on said bolt, said clamp further attached to said mast, said mast further coupled to said pedestal to support said dish antenna.

3. The rotation apparatus as defined in claim 2, wherein said clamp includes a pair of holes, said bolt passing through said pair of holes so that said clamp moves about said pivot.

4. The rotation apparatus as defined in claim 2, wherein said mast rotates to determine an azimuth angle of said dish antenna.

5. The rotation apparatus as defined in claim 1, wherein said circular grooves and said guide grooves have scales to indicate rotation angles.

6. The rotation apparatus as defined in claim 1, wherein said wings and said bottom are an organic whole.

7. The rotation apparatus as defined in claim 1, wherein said dish bracket and said dish antenna are an organic whole.

8. The rotation apparatus as defined in claim 1, wherein said dish bracket includes a device bracket to support a multi-switch device.

9. The rotation apparatus as defined in claim 1, wherein said dish bracket includes an arm.

10. The rotation apparatus as defined in claim 9, wherein said arm couples a Y-adaptor, said Y-adaptor coupling a plurality of low noise blocking converters.

11. The rotation apparatus as defined in claim 1, wherein said circular grooves are positioned to allow said dish antenna to rotate through a range of at least 110 degrees.

12. The rotation apparatus as defined in claim 1, wherein said guide grooves of said elevation bracket include scales to provide a visible indication of an elevation angle, and wherein the elevation bracket allows said dish antenna to be moved through a range of elevation angles of at least 65 degrees.

13. The rotation apparatus as defined in claim 1, wherein at least one of said wings of said elevation bracket includes a hole which positions a trimming device, said trimming device coupled to said bolt of said guide grooves of said wings.

14. A rotation apparatus for a dish antenna, which enables the dish antenna to be easily adjusted to [an] *a* precise receiving position, comprising:

a dish bracket attached to a back of said dish antenna, said dish bracket including a plurality of circular grooves and a concentric axle center; and an elevation bracket adjustably positioned proximate to said dish bracket, said elevation bracket comprising:

a pair of parallel wings, wherein a pivot hole is formed on the front portion of [the] each wing and a respective guide groove is formed in a portion of each of said wings to adjust an elevation angle of said dish antenna;

a bottom perpendicularly integrated to said wings, said bottom including a central axle hole coupled to said concentric axle center of said dish bracket, said bottom further including at least one hole in alignment with said circular grooves of said dish bracket;

a bolt which passes through said pivot hole of said wings to provide a pivot about which said wings move to adjust an elevation angle of said dish antenna; and at least one fastener positionable through said holes to engage said circular grooves to secure said elevation bracket to said dish bracket after said dish antenna is rotated to a selected position.

15. The rotation apparatus as defined in claim 14, wherein at least a portion of at least one of said circular grooves includes a scale which provides a visible indication of a rotation angle of said dish antenna.

16. The rotation apparatus as defined in claim 14, wherein at least a portion of at least one of said guide grooves includes a scale which provides a visible indication of an elevation angle of said dish antenna.

17. The rotation apparatus as defined in claim 14, further including a clamp, a mast and a pedestal, wherein said clamp is positioned between said wings and rotates on said pivot, said clamp attached to said mast, said mast coupled to said pedestal to support said dish *antenna*.

18. The rotation apparatus as defined in claim 17, wherein said mast rotates to determine an azimuth angle of said dish antenna.

19. The rotation apparatus as defined in claim 17, wherein said clamp includes a pair of holes and wherein said pivot passes through said pair of holes.

20. The rotation apparatus as defined in claim 14, wherein said dish bracket and said dish antenna are an organic whole.

21. The rotation apparatus as defined in claim 14, wherein said dish bracket includes a device bracket for a multi-switch device.

22. The rotation apparatus as defined in claim 14, wherein said dish bracket includes an arm.

23. The rotation apparatus as defined in claim 22, wherein said arm couples a Y-adaptor, and wherein said Y-adaptor couples a plurality of low noise block convertors.

24. The rotation apparatus as defined in claim 14, wherein said circular grooves allow said dish antenna to rotate through a range of rotation angles of at least 110 degrees.

25. The rotation apparatus as defined in claim 14, wherein said guide grooves of said elevation bracket allow said dish antenna to move through a range of elevation angles of at least 65 degrees.

26. The rotation apparatus as defined in claim 14, wherein at least one of said wings of said elevation bracket includes a hole which positions a trimming device, said trimming device coupled to said guide grooves of said [at least one wing of said elevation bracket] *wings*.

*27. A rotation apparatus for accurately positioning a dish antenna, comprising:*

*a dish bracket connected to a back of said dish antenna, said dish bracket including a plurality of circular grooves; and*

*an elevation bracket adjustably positioned proximate to said dish bracket, said elevation bracket comprising:*

*a pair of parallel wings wherein a pivot hole is formed on the front portion of each of said wings for receiving a bolt which passes through each of said wings and a respective guide groove is formed in a portion of each of said wings to adjust an elevation angle of said dish antenna; and*

*a bottom perpendicularly integrated to said wings, said bottom including at least one fastener engaged with said circular grooves of said dish bracket to move along said circular grooves and to secure said elevation bracket to said dish bracket.*

*28. The rotation apparatus as defined in claim 27, further including a clamp, a mast and a pedestal, wherein said clamp is positioned between said wings and rotates on said bolt, said clamp further attached to said mast, said mast further coupled to said pedestal to support said dish antenna.*

*29. The rotation apparatus as defined in claim 28, wherein said clamp includes a pair of holes, said bolt passing through said pair of holes so that said clamp moves about said bolt.*

*30. The rotation apparatus as defined in claim 28, wherein said mast rotates to determine an azimuth angle of said dish antenna.*

*31. The rotation apparatus as defined in claim 27, wherein said circular grooves and said guide grooves have scales to indicate rotation angles.*

*32. A rotation apparatus for a dish antenna, which enables the dish antenna to be easily adjusted to a precise receiving position, comprising:*

*a dish bracket attached to a back of said dish antenna, said dish bracket including a plurality of circular grooves; and*

*an elevation bracket adjustably positioned proximate to said dish bracket, said elevation bracket comprising:*

*a pair of parallel wings, wherein a pivot hole is formed on the front portion of each of said wings and a respective guide groove is formed in a portion of each of said wings to adjust an elevation angle of said dish antenna;*

*a bottom perpendicularly integrated to said wings, said bottom including at least one fastener engaged with said circular grooves of said dish bracket to move along said circular grooves and to secure said elevation bracket to said dish bracket; and*

*a bolt which passes through said pivot hole of said wings to provide a pivot about which said wings move to adjust an elevation angle of said dish antenna.*

*33. The rotation apparatus as defined in claim 32, wherein at least a portion of at least one of said circular grooves includes a scale which provides a visible indication of a rotation angle of said dish antenna.*

*34. The rotation apparatus as defined in claim 32, further including a clamp, a mast and a pedestal, wherein said clamp is positioned between said wings and rotates on said pivot, said clamp attached to said mast, said mast coupled to said pedestal to support said dish antenna.*

*35. The rotation apparatus as defined in claim 34, wherein said mast rotates to determine an azimuth angle of said dish antenna.*

*36. The rotation apparatus as defined in claim 34 wherein said clamp includes a pair of holes and wherein said pivot passes through said pair of holes.*

*37. A rotation apparatus for accurately positioning a dish antenna, comprising:*

*a dish bracket connected to a back of said dish antenna, said dish bracket including a circular groove and a concentric axle center; and*

*an elevation bracket adjustably positioned proximate to said dish bracket, said elevation bracket comprising:*

*a pair of parallel wings, wherein a pivot hole is formed on the front portion of each of said wings for receiving a bolt which passes through each of said wings and a respective guide groove is formed in a portion of each of said wings to adjust an elevation angle of said dish antenna; and*

*a bottom perpendicularly integrated to said wings, said bottom including a central axle hole coupled to said concentric axle center of said dish bracket, said bottom further including at least one hole aligned with said circular groove of said dish bracket through which at least one fastener engages said circular groove to secure said elevation bracket to said dish bracket.*

* * * * *